(12) United States Patent
Jerschow et al.

(10) Patent No.: US 7,563,855 B2
(45) Date of Patent: *Jul. 21, 2009

(54) FLAME-RETARDANT SILICONE RUBBER

(75) Inventors: Peter Jerschow, Burghausen (DE); Peter Gerhardinger, Burghausen (DE)

(73) Assignee: Wacker Chemie AG, Munich (DE)

( * ) Notice: Subject to any disclaimer, the term of this patent is extended or adjusted under 35 U.S.C. 154(b) by 401 days.

This patent is subject to a terminal disclaimer.

(21) Appl. No.: 11/302,811

(22) Filed: Dec. 14, 2005

(65) Prior Publication Data

US 2006/0142453 A1 Jun. 29, 2006

(30) Foreign Application Priority Data

Dec. 23, 2004 (DE) .................. 10 2004 062 351

(51) Int. Cl.
*C08L 83/04* (2006.01)
*H01B 3/46* (2006.01)

(52) U.S. Cl. .................. 528/15; 528/24; 528/31; 528/32; 524/430; 174/110 S

(58) Field of Classification Search .................. None
See application file for complete search history.

(56) References Cited

U.S. PATENT DOCUMENTS

| 4,405,425 A | 9/1983 | Schiller et al. |
| 4,701,488 A | 10/1987 | Williams |
| 4,803,244 A | 2/1989 | Umpleby |
| 5,057,151 A | 10/1991 | Schuster et al. |
| 6,069,201 A | 5/2000 | Okinoshima et al. |
| 6,573,328 B2 * | 6/2003 | Kropp et al. ............ 524/588 |
| 7,129,309 B2 * | 10/2006 | Fehn et al. ............. 528/19 |
| 7,291,670 B2 * | 11/2007 | Fehn et al. ............. 524/588 |

FOREIGN PATENT DOCUMENTS

| DE | 38 31 478 A1 | 3/1990 |
| DE | 38 39 900 A1 | 5/1990 |
| EP | 0 355 459 B1 | 2/1990 |
| EP | 0 359 251 A2 | 3/1990 |
| WO | WO 2004/013230 * | 2/2004 |

OTHER PUBLICATIONS

English Derwent Abstract AN 1990-085070(12) corresponding to DE 38 31 478 A1.
English Derwent Abstract AN 1990-085069(12) corresponding to EP 0 359 251 A2.
English Derwent Abstract AN 1990-052256(08) corresponding to EP 0 355 459 B1.
US Patent No. 5,057,151 corresponds to DE 38 39 900, (copy not enclosed).

* cited by examiner

*Primary Examiner*—Marc S Zimmer
(74) *Attorney, Agent, or Firm*—Brooks Kushman P.C.

(57) ABSTRACT

Flame-retardant compositions contain peroxidically crosslinking, addition-crosslinking or condensation-crosslinking silicone rubber and at least one rhodium compound or iridium compound or mixtures of the two. The compositions exhibit increased flame retardancy as compared to similar compositions containing platinum complexes, and especially when used in conjunction with the latter, produce stable ceramic layers upon combustion.

11 Claims, No Drawings

FLAME-RETARDANT SILICONE RUBBER

BACKGROUND OF THE INVENTION

1. Field of the Invention

The invention relates to compositions of flame-retardant silicone rubber materials and cables and profiles insulated therewith

2. Background Art

Flame-retardant compositions are disclosed in DE 38 31 478, which describes a composition which contains polysiloxane; a metal oxide such as cerium oxide, zirconium oxide or titanium oxide; a platinum compound; and an organosilicon compound having basic nitrogen bonded to silicon via carbon. However, this composition has a very intensive odor and its flame-retardant properties are unsatisfactory.

SUMMARY OF THE INVENTION

An object of the invention is to provide improved flame-retardant silicone rubber compositions, to provide a silicone rubber useful as a cable insulation material which overcomes the disadvantages of the prior art, and in particular, to provide a cable insulation material which is flame-retardant, enables function to be maintained in the event of a fire, and which simultaneously has a low density. These and other objects are achieved by providing silicon rubber compositions containing at least one rhodium or iridium compound.

DETAILED DESCRIPTION OF THE PREFERRED EMBODIMENT(S)

The invention thus relates to a flame-retardant composition containing peroxidically crosslinking, addition-crosslinking or condensation-crosslinking silicone rubber and at least one rhodium compound or iridium compound or mixtures thereof.

The silicone rubber according to the invention is preferably a peroxidically crosslinking organopolysiloxane material which preferably contains the components described below.

Organopolysiloxanes comprising units of the general formula $$R_r SiO_{\frac{4-r}{2}}$$

in which
R are identical or different, and are hydrogen or an optionally substituted hydrocarbon radical, and
r is 0, 1, 2 or 3 and has an average numerical value of from 1.9 to 2.1.

Examples of hydrocarbon radicals R are alkyl radicals such as the methyl, ethyl, n-propyl, isopropyl, n-butyl, isobutyl, tert-butyl, n-pentyl, isopentyl, neopentyl and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, octadecyl radicals such as the n-octadecyl radical; cycloalkyl radicals such as the cyclopentyl, cyclohexyl, cycloheptyl, and methylcyclohexyl radicals; aryl radicals such as the phenyl, biphenyl, naphthyl, anthryl, and phenanthryl radicals; alkaryl radicals such as the o-, m- and p-tolyl radicals, xylyl radicals and ethylphenyl radicals; and aralkyl radicals such as the benzyl radical and the α- and the β-phenylethyl radicals.

Examples of substituted hydrocarbon radicals R are halogenated alkyl radicals such as the 3-chloropropyl, the 3,3,3-trifluoropropyl and the perfluorohexylethyl radicals, and halogenated aryl radicals such as the p-chlorophenyl and the p-chlorobenzyl radical.

Radical R is preferably a hydrogen atom or a hydrocarbon radical having 1 to 8 carbon atoms, most preferably the methyl radical.

Other preferred radicals R are alkenyl radicals having 2 to 8 carbon atoms, most preferably the vinyl radical. Further examples of radicals R are the vinyl, allyl, methallyl, 1-propenyl, 1-butenyl and 1-pentenyl radical, 5-hexenyl, butadienyl, hexadienyl, cyclopentenyl, cyclopentadienyl, cyclohexenyl, ethynyl, propargyl and 1-propynyl radicals.

In the case of optionally substituted hydrocarbon radicals having 1 to 8 carbon atoms, the methyl, vinyl, phenyl and 3,3,3-trifluoropropyl radical are particularly preferred.

Preferably, alkyl radicals, in particular methyl radicals, are bonded to at least 70 mol % of the Si atoms contained in the organopolysiloxane (A) comprising units of the formula (I). If, in addition to Si-bonded methyl and/or 3,3,3-trifluoropropyl radicals, the organopolysiloxanes also contain Si-bonded vinyl and/or phenyl radicals, the latter are preferably contained in amounts of 0.001-30 mol %.

The organopolysiloxanes (A) comprise predominantly diorganosiloxane units. The terminal groups of the organopolysiloxanes may be trialkylsilyloxy groups, in particular the trimethylsilyloxy radical or the dimethylvinylsilyloxy radical; however, one or more of these alkyl groups may also be replaced by hydroxyl groups or alkoxy groups, such as methoxy or ethoxy radicals.

The organopolysiloxanes (A) may be liquids or highly viscous substances. The organopolysiloxanes (A) preferably have a viscosity of from $10^3$ to $10^8$ mm$^2$/s at 25° C.

Preferably used crosslinking agents in the silicone rubber materials according to the invention are peroxides, such as dibenzoyl peroxide, bis(2,4-dichlorobenzoyl) peroxide, dicumyl peroxide and 2,5-bis(tert-butylperoxy)-2,5-dimethylhexane and mixtures thereof, bis(2,4-dichlorobenzoyl) peroxide and 2,5-bis(tert-butylperoxy)-2,5-dimethylhexane being preferred. Furthermore, a mixture of bis(4-methylbenzoyl) peroxide (=PMBP) and 2,5-dimethyl-2,5-di(tert-butylperoxy)hexane (=DHBP) in a ratio of from 1:0.4 to 0.5:1, preferably in a ratio of from 1:0.4, is preferably used as the crosslinking agent.

Furthermore, the organopolysiloxanes (A) according to the invention preferably contain reinforcing and/or nonreinforcing fillers. Examples of reinforcing fillers are pyrogenic or precipitated silicas having BET surface areas of at least 50 m$^2$/g. The silica fillers may have a hydrophilic character or may have been rendered hydrophobic by known methods. In this context, reference may be made, for example, to DE 38 39 900 A (Wacker-Chemie GmbH; filed on Nov. 25, 1988) or the corresponding U.S. Pat. No. 5,057,151. In general, water repellency is then imparted for from 1 to 20% by weight of hexamethyldisilazane and/or divinyltetramethyldisilazane and from 0.5 to 5% by weight of water, based in each case on the total weight of the organopolysiloxane material, these reagents advantageously being added in a suitable mixing apparatus, such as, for example, a kneader or internal mixer, to the already initially introduced organopolysiloxane (A), before the hydrophilic silica is gradually incorporated into the material.

Examples of nonreinforcing fillers are quartz powder, diatomaceous earth, calcium silicate, zirconium silicate, zeolites, metal oxide powder such as aluminum oxide, titanium oxide, iron oxide or zinc oxide, barium silicate, barium sulfate, calcium carbonate, gypsum and plastic powder such as polyacrylonitrile powder and polytetrafluoroethylene powder. Furthermore, fibrous components, such as glass fibers and plastic fibers, may be used as fillers. The BET surface area of these fillers is preferably less than 50 m²/g.

The organopolysiloxane materials which can be crosslinked to give elastomers may contain filler (B) in amounts of, preferably, from 1 to 200 parts by weight, more preferably from 30 to 100 parts by weight, based in each case on 100 parts by weight of organopolysiloxane (A).

According to the respective use, additives (C), such as processing auxiliaries, for example, plasticizers, pigments and stabilizers, for example, heat stabilizers, may be added to the organopolysiloxane materials which can be vulcanized to give elastomers.

Examples of plasticizers which can be used as additives (C) are polydimethylsiloxanes terminated with trimethylsilyl groups or hydroxyl groups and having a viscosity of not more than 1000 mm²/s at 25° C., or diphenylsilanediol.

Examples of heat stabilizers which can be used as additives (C) are transition metal salts of fatty acids, such as iron octanoate, transition metal silanolates such as iron silanolate, and cerium(IV) compounds.

The materials according to the invention preferably contain no further substances over and above those previously mentioned.

The respective components used for the preparation of the materials according to the invention may be in each case an individual type of such a component as well as a mixture of at least two different types of such a component. Furthermore, customary condensation-crosslinking organopolysiloxanes, as described in, for example, EP 0 359 251, which is hereby incorporated by reference, or known addition-crosslinking RTV materials or HTV materials, as described in EP 0355459 B1, which is hereby incorporated by reference, can also be used as silicone rubber materials.

An example of the preparation of an addition-crosslinking HTV silicone rubber involves mixing together 75 parts of a diorganopolysiloxane endcapped by trimethylsilyloxy groups and comprising 99.7 mol % of dimethylsiloxane units and 0.3 mol % of vinylmethylsiloxane units, having a viscosity of $8 \times 10^6$ mPa·s at 25° C., and 25 parts of a diorganopolysiloxane endcapped by trimethylsilyloxy groups and comprising 99.4 mol % of dimethylsiloxane units and 0.6 mol % of vinylmethylsiloxane units, having a viscosity of $8 \times 10^6$ mPa·s at 25° C., in a kneader operated at 150° C., 45 parts of pyrogenic silica produced in the gas phase and having a BET surface area of 300 m²/g, and 7 parts of a dimethylpolysiloxane having one Si-bonded hydroxyl group each in the terminal units and having a viscosity of 40 mPa·s at 25° C., and kneading for two hours.

The preferred rhodium compounds useful in the invention are $[Rh(O_2CCH_3)_2]_2$, $Rh(O_2CCH_3)_3$, $Rh_2(C_8H_{15}O_2)_4$, $Rh(C_5H_7O_2)_3$, $Rh(C_5H_7O_2)(CO)_2$, $Rh(CO)[Ph_3P](C_5H_7O_2)$, $Rh(CO)_2(C_5H_7O_2)$, $RhCl_3[(R)_2S]_3$, $(R^2_3P)_2Rh(CO)X$, $(R^2_3P)_3Rh(CO)H$ and $Rh_2X_2Y_4$, and rhodium compounds, of the formula

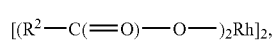

(III)

$L(X)Rh(PR^3_3)_s$, or (IV)

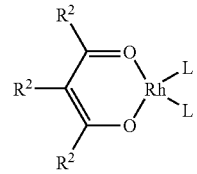

(V)

in which
$R^2$ are identical or different and are a hydrogen atom or monovalent, optionally substituted hydrocarbon radical having 1 to 24 carbon atoms,
$R^3$ are identical or different and are hydrogen, —$OR^4$ or monovalent, optionally substituted hydrocarbon radical having 1 to 24 carbon atoms,
$R^4$ are identical or different and are a hydrogen atom, or a monovalent, optionally substituted hydrocarbon radical having 1 to 20 carbon atoms,
X are identical or different and is halogen or hydrogen,
L are identical or different and is CO, acetylacetonate, 0.5 cyclooctadiene, 0.5 norbornadiene, or $P(R^3)_3$, and
S is 2 or 3.

Rhodium compounds such as $[Rh(O_2CCH_3)_2]_2$, $Rh(O_2CCH_3)_3$, $Rh_2(C_8H_{15}O_2)_4$, $Rh(C_5H_7O_2)_3$, $Rh(C_5H_7O_2)(CO)_2$, $Rh(CO)[Ph_3P](C_5H_7O_2)$, $Rh(CO)_2(C_5H_7O_2)$, Rh $RhCl_3[(R)_2S]_3$, $(R^2_3P)_2Rh(CO)X$, $(R^2_3P)_3Rh(CO)H$ and $Rh_2X_2Y_4$, are preferred, X being hydrogen, chlorine, bromine or iodine, Y being ethyl, CO, $C_8H_{14}$ or 0.5 $C_8H_{12}$, where each R is identical or different and is an optionally substituted organic hydrocarbon radical free of aliphatic carbon-carbon multiple bonds and having up to 18 carbon atoms; R is preferably an alkyl radical, cycloalkyl radical or aryl radical.

Examples of radicals R are alkyl radicals such as the methyl, ethyl, n-propyl, isopropyl, n-butyl, isobutyl, tert-butyl, n-pentyl, isopentyl, neopentyl and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as n-decyl radical, dodecyl radicals such as the n-dodecyl radical, and octadecyl radicals such as the n-octadecyl radical, cycloalkyl radicals such as the cyclopentyl, cyclohexyl, cycloheptyl and methylcyclohexyl radicals, aryl radicals such as the phenyl, naphthyl, anthryl and phenanthryl radicals, alkaryl radicals such as the o-, m- and p-tolyl radicals, xylyl radicals and ethylphenyl radicals, and aralkyl radicals such as the benzyl radical and the α- and the β-phenylethyl radicals.

Examples of substituted radicals R are haloalkyl radicals, such as the 3,3,3-trifluoro-n-propyl radical, the 2,2,2,2',2',2'-hexafluoroisopropyl radical, or the heptafluoroisopropyl radical, and haloaryl radicals, such as the o-, m- and p-chlorophenyl radical.

Radical R is preferably a monovalent SiC-bonded, optionally substituted hydrocarbon radical free of aliphatic carbon-carbon multiple bonds and having 1 to 18 carbon atoms, more preferably a monovalent SiC-bonded hydrocarbon radical free of aliphatic carbon-carbon multiple bonds and having 1 to 6 carbon atoms, and most preferably a methyl or phenyl radical and $R^2$ is an alkyl radical, such as the methyl, ethyl and butyl radical, or an aryl radical, such as the phenyl or tolyl radical, or an oxygen-substituted radical such as the methoxy, ethoxy or phenoxy radical. The rhodium compound is preferably (acetylacetonato)carbonyl-(triphenylphosphine)rhodium(I), (acetylacetonato)dicarbonylrhodium(I), carbonylchlorobis(triphenylphosphine)rhodium(I), (acetylacetonato) (1,5-cyclooctadiene)rhodium(I), rhodium (II) acetate dimer, rhodium(III) acetylacetonate and rhodium (II) octanoate dimer, more preferably tetracarbonyldi-µ-chloro-dirhodium, and the iridium compound is preferably $Ir(OOCCH_3)_3$, $Ir(C_5H_7O_2)_3$, $[Ir(Z)(Ene)_2]_2$ and $[Ir(Z)(Diene)]_2$, where Z is chlorine, bromine, iodine or alkoxy, Ene is olefin and Diene is cyclooctadiene. Preferred iridium compounds are chlorobis(cyclooctane)iridium(I) dimer, chlorobis(1,5-cyclooctadiene)iridium(I) dimer and iridium(III) acetylacetonate.

The rhodium and iridium compounds are preferably used in amounts of from 0.1 to 10 parts by weight, more preferably 0.1-9 parts by weight, yet more preferably from 0.1 to 5 parts by weight, and most preferably from 0.1 to 0.8 part by weight, based on the total weight of the composition.

Those organosilicon compounds having basic nitrogen bonded via carbon to silicon which may be contained in the composition according to the invention include those of the formula:

$$Y_a R^5_b Si(OR^6)_{4-a-b}$$

in which each $R^5$ is an identical or different monovalent hydrocarbon radical having 1 to 8 carbon atom(s) per radical, each $R^6$ is an identical or different alkyl group having 1 to 4 carbon atom(s) per radical or a radical of the formula —$SiR_3$, each Y is an identical or different monovalent SiC-bonded organic radical comprising basic nitrogen, a is 1 or 2 and b is 0, 1 or 2, and disiloxanes of the formula $$(Y_c R^5_d Si)_2 O,$$

in which $R^5$ and Y have the meaning stated above therefor, c is 0, 1, 2 or 3, in particular 1, with the proviso that the disiloxanes have at least one radical Y, and d is 0, 1, 2 or 3, in particular 2, and the sum of d+e is 3.

The organosilicon compounds having basic nitrogen bonded via carbon to silicon can, however, also be organo(poly)siloxanes having not more than 10 Si atoms, comprising units of the formula $$Y_x R^5_y Si(OR^6)_z O_{\frac{4-x-y-z}{2}}$$

in which $R^5$ and $R^6$ have the meaning stated above therefor, x is 0, 1 or 2, y is 0, 1, 2 or 3 and z is 0, 1 or 2.

Examples of hydrocarbon radicals R are the methyl, ethyl, n-propyl, isopropyl, butyl and 2-ethylhexyl radicals; radicals composed of carbon and hydrogen atoms and having an aliphatic multiple bond such as the vinyl and allyl radicals; cycloaliphatic hydrocarbon radicals such as the cyclopentyl radical and cyclohexyl, and methylcyclohexyl radicals; aromatic hydrocarbon radicals such as the phenyl and xylyl radicals; alkaryl radicals such as the tolyl radical; and aralkyl radicals such as the benzyl radical. Preferably, however, the hydrocarbon radicals $R^5$ are free of aliphatic multiple bonds, in particular if they are bonded to silicon atoms to which basic nitrogen is also bonded via carbon. Simply because of the easier accessibility, it is furthermore preferable if at least 50% of the number of radicals $R^5$ are methyl radicals.

The abovementioned examples of alkyl radicals $R^5$ having 1 to 4 carbon atom(s) per radical are fully applicable also to the radicals $R^6$.

The radicals Y are preferably those of the formula $$R^7 NHR^8—,$$

in which $R^7$ denotes hydrogen or identical or different alkyl, cycloalkyl, or aminoalkyl radicals having 1 to 8 carbon atoms per radical, and $R^8$ denotes identical or different straight-chain or branched hydrocarbon radicals free of aliphatic multiple bonds and having one carbon atom or 3 or 4 carbon atoms per radical, in particular the radical of the formula $$—(CH_2)_3.$$

The examples of alkyl and cycloalkyl radicals $R^5$ are fully applicable also to alkyl or cycloalkyl radicals $R^7$.

Examples of aminoalkyl radicals $R^7$ are those of the formula $$H_2N(CH_2)_3—$$

$$H_2N(CH_2)_2NH(CH_2)_2—$$

$$H_2N(CH_2)_2—$$

$$(H_3C)_2NH(CH_2)_2—$$

$$H_2N(CH_2)_4—$$

$$H(NHCH_2CH_2)_3— \text{ and}$$

$$C_4H_9NH(CH_2)_2NH(CH_2)_2—.$$

Preferably used organosilicon compounds having basic nitrogen bonded via carbon to silicon are N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, 3-aminopropyltriethoxysilane, N-(cyclohexyl)-3-aminopropyltrimethoxysilane, N-(2-aminoethyl)-3-aminopropyl-tris(trimethylsilyloxy)silane and 1,2-bis[N-(2-aminoethyl)-3-aminopropyl]-1,1,2,2-tetramethyldisiloxane. N-(2-Aminoethyl)-3-aminopropyl-trimethoxysilane is particularly preferably used.

Metal oxides from the group consisting of magnesium oxide, aluminum oxide, tin oxide, calcium oxide, titanium oxide, barium oxide, zirconium oxide, zinc oxide, cerium oxide and metal compounds of these groups where oxides form on heating, such as, for example, hydroxides, including furthermore boric acid and zinc borate, may be contained in the composition according to the invention, all compounds of this group being used in amounts of from 1.5% to 40% by weight, always based on the total weight of the composition, preferably from 10 to 20% by weight. It is also possible to use their mixtures. Among these compounds, hydroxides of Al, Sn, Ca, Ti, Ba, Zr, Zn and Ce are preferred, and aluminum hydroxide, boric acid and zinc borate are particularly preferred.

The compositions according to the invention may contain platinum complexes which have at least one unsaturated group, such as platinum-olefin complexes, platinum-aldehyde complexes, platinum-ketone complexes, platinum-vinylsiloxane complexes, platinum-1,3-divinyl-1,1,3,3-tetramethyldisiloxane complexes with or without a content of detectable organic halogen, platinum-norbornadiene-methyl acetonate complexes, bis(gammapicoline)platinum dichloride, trimethylenedipyridineplatinum dichloride, dicyclopentadieneplatinum dichloride, dimethylsulfoxyethyleneplatinum(II) dichloride, reaction products of platinum tetrachloride with olefin and primary amine or secondary amine or primary and secondary amine, reaction products of platinum tetrachloride, dissolved in 1-octene, with sec-butylamine, platinum-1,3-divinyl-1,1,3,3-tetramethyldisiloxane complex being particularly preferred. This platinum complex is added in amounts of from 5 to 200 ppm, preferably from 10 to 100 ppm, the amount being based on pure platinum. It is also possible to use mixtures of the platinum complexes.

For the preparation of the composition according to the invention, all abovementioned components are mixed.

The present invention furthermore relates to cables and profiles which contain the composition according to the invention. The cables are preferably communication or energy cables. The profiles are silicone foams or solid seals for fire barriers for rooms, cupboards and safes and ablation materials for lining rocket engines, etc.

Surprisingly, the present invention permits flame-retardance and, if the platinum complex is present, a sinter process already begins at a temperature of 650° C. and leads to the formation of a ceramic layer comprising the combustion products of silicone rubber. Consequently, silicone rubber blends can be produced for applications in which maintenance of function in the event of a fire is required, with a low density (not more than 1.27) and therefore an unchanged property level with regard to mechanical, electrical and heat-aging properties in comparison with standard silicone rubber. Compared with the customary silicone rubber materials, a better mechanical property level, better heat-aging properties and higher insulation capability, especially in the temperature range above 900° C., is achieved by the low density of the compositions according to the invention. The ceramic formed in the event of fire is moreover substantially more insensitive to impact and vibrations than the mixtures described in the prior art, which form only a stable ash layer.

REFERENCE EXAMPLE 1

Pt Without Rhodium 100 parts of a diorganopolysiloxane endcapped by trimethylsilyloxy groups and comprising 99.93 mol percent of dimethylsiloxane units and 0.07 mol percent of vinylmethylsiloxane units, having a viscosity of $8 \cdot 10^6$ mPa·s at 25° C., are mixed, in a kneader operated at 150° C., first with 50 parts of silica produced pyrogenically in the gas phase and having a surface area of 200 m$^2$/g, then with 1 part of dimethylpolysiloxane endcapped by trimethylsilyloxy groups and having a viscosity of 96 mPa·s at 25° C., then with 7 parts of a dimethylpolysiloxane having one Si-bonded hydroxyl group each in the terminal units and having a viscosity of 40 mPa·s at 25° C., and then mixed in a kneader with 36 parts of aluminum oxide having a particle size of >10 μm with a content of alkali metal oxides of <0.5% by weight and 0.3% by weight of a platinum-1,3-divinyl-1,1,3,3-tetramethyldisiloxane complex.

EXAMPLE 2

Rhodium Without Pt 100 parts of a diorganopolysiloxane endcapped by trimethylsilyloxy groups and comprising 99.93 mol percent of dimethylsiloxane units and 0.07 mol percent of vinylmethylsiloxane units, having a viscosity of $8 \cdot 10^6$ mPa·s at 25° C., are mixed, in a kneader operated at 150° C., first with 50 parts of silica produced pyrogenically in the gas phase and having a surface area of 200 m$^2$/g, then with 1 part of dimethylpolysiloxane endcapped by trimethylsilyloxy groups and having a viscosity of 96 mPa·s at 25° C., then with 7 parts of a dimethylpolysiloxane having one Si-bonded hydroxyl group each in the terminal units and having a viscosity of 40 mPa·s at 25° C., and then mixed in a kneader with 36 parts of aluminum oxide having a particle size of >10 μm with a content of alkali metal oxides of <0.5% by weight and 2% by weight of a concentrate of 0.6 parts of a rhodium complex soluble in silicone and having a rhodium content of 60%, dissolved in 120 parts of polydimethylsiloxane matrix.

COMPARATIVE EXAMPLE C3

The procedure described in example 1 is repeated, except that no platinum complex and no rhodium complex are used.

COMPARATIVE EXAMPLE C4

The procedure described in example 2 is repeated, except that furthermore no aluminum oxide is added.

EXAMPLE 5

The procedure described in example 2 is repeated, except that furthermore no aluminum oxide is added. However, the rhodium complex is added.

REFERENCE EXAMPLE 6

The procedure described in example 1 is repeated, except that titanium oxide is added instead of aluminum oxide.

EXAMPLE 7

The procedure described in Example 1 is repeated, except that no aluminum oxide is added. However, the rhodium complex, the Pt complex and 0.09 part of N-(2-aminoethyl)-3-aminopropyltrimethoxysilane are added.

EXAMPLE 8

The procedure described in Example 7 is repeated, and no aluminum oxide is added. However, both the rhodium complex and the Pt complex are added.

EXAMPLE 9

The procedure described in Example 7 is repeated, and no aluminum oxide is added. No Pt complex is added. However, the rhodium complex is added.

EXAMPLE 10

The procedure described in example 2 is repeated, except that furthermore no aluminum oxide is added. However, the rhodium complex and 0.09 part of N-(2-aminoethyl)-3-aminopropyltrimethoxysilane are added. Using the materials of the examples and comparative examples, an electrical conductor (1.5 mm2 wire) is insulated by extrusion. The wall thickness is 1 mm. One meter long sections of the 4 test samples obtained in each case in the form of a stranded cable pair having a twist length of about 5 cm, were heated to 930° C. in an 80 cm long, electrically heated tubular furnace. A voltage of 500 volt AC is applied at one end of the twisted pair for the entire duration of the experiment. The other end is open. The duration of the experiment is 2 hours.

In addition, test panels are also produced from the comparative examples.

Sample According to Example C4

After ignition of the cable insulation at about 420° C., the latter burns and forms a solid ceramic layer. The voltage load of 500 volt is maintained for the 2 hours at 930° C. without a short-circuit occurring, although isolated small cracks form in the ceramic layer as a result of the thermal expansion of the metallic conductor. Furthermore, a 2 mm thick test panel of this material has a limiting oxygen index (LOI) of 27%.

Sample According to Example 5

After ignition of the cable insulation at about 420° C., the latter burns and forms an ash which is mechanically unstable. The voltage load of 500 volt is maintained for the 2 hours at 930° C. A short-circuit occurs as early as during heating because no ceramic forms. However, a substantially slower combustion process is observed. Furthermore, a 2 mm thick test panel of this material has a limiting oxygen index (LOI) of 33%, indicating the observed high flame-retardance. The panel and the mixture are odorless.

Sample According to Reference Example 6

After ignition of the cable at 420° C., the latter burns and forms a cohesive ash layer which, however, subsequently falls off even before 930° C. is reached, with the result that contact and hence short-circuit occur owing to the thermal dilation of the wires. The test panel has an LOI of 23%.

Sample According to Example 8

After ignition of the cable at 420° C., the latter burns and forms a pulverulent ash layer which falls off during the combustion itself, and a short-circuit occurs shortly thereafter. The test panel has an LOI of 33%.

Sample According to Example 9

After ignition of the cable at 420° C., the latter burns and forms a pulverulent ash layer which falls off during the combustion itself, and a short-circuit occurs shortly thereafter. The test panel has an LOI of 23%.

Sample According to Reference Example 6

After ignition of the cable at 420° C., the latter burns and forms a pulverulent firmly adhering ash layer which falls off during the combustion itself, and a short-circuit occurs shortly thereafter. The test panel has an LOI of 27%.

Sample According to Example 8

After ignition of the cable at 420° C., the latter burns and forms a ceramic-like ash layer which is firmer than in the results according to example 1; no short-circuit occurs. The test panel has an LOI of 35%. However, the test panel has an amine-like odor.

Sample According to Example 9

After ignition of the cable at 420° C., the latter burns and forms a ceramic-like ash layer which is firmer than in the results according to example 1; no short-circuit occurs. The test panel has an LOI of 29%. However, the test panel has an amine-like odor.

Sample According to Example 10

After ignition of the cable at 420° C., the latter burns and forms a pulverulent firmly adhering ash layer which falls off during the combustion itself; a short-circuit occurs shortly thereafter. The test panel has an LOI of 33%. However, the test panel has an amine-like odor.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A flame-retardant composition containing peroxidically crosslinking, addition-crosslinking or silicone and at least one rhodium compound or iridium compound or mixture thereof, wherein the silicone rubber is derived from organopolysiloxanes comprising units of the general formula

in which

R is alkyl radical, such as methyl, ethyl, n-propyl, isopropyl, n-butyl, isobutyl, tert-butyl, n-pentyl, isopentyl, neopentyl, or tert-pentyl radical; a hexyl radical such as n-hexyl radical; a heptyl radical such as n-heptyl radical; an octyl radical such as n-octyl radical; an isooctyl radical such as 2,2,4-trimethylpentyl radical; a nonyl radical such as n-nonyl radical; a decyl radical such as n-decyl radical; a dodecyl radical such as n-dodecyl radical; an octadecyl radical such as n-octadecyl radical; a cycloalkyl radical such as cyclopentyl, cyclohexyl, cycloheptyl radical and, methylcyclohexyl radical; an aryl radical such as the phenyl, biphenyl, naphthyl, anthryl, and phenanthryl radical; an alkenyl radical having 2 to 8 carbon atoms; an alkaryl radical such as o-, m- and p-tolyl radicals, xylyl radical, and ethylphenyl radical; an aralkyl radical such as the benzyl radical and the α- and the β-phenylethyl radical, wherein R may be identical or different and is an optionally substituted hydrocarbon radical as halogenated alkyl radicals and halogenated aryl radicals r is 0, 1, or 3 and has an average numerical value of from 1.9 to 2.1.

2. The flame-retardant composition of claim 1, wherein at least one rhodium compound is selected from the group consisting of $[Rh(O_2CCH_3)_2]_2$, $Rh(O_2CCH_3)_3$, $Rh_2(C_8H_{15}O_2)_4$, $Rh(C_5H_7O_2)_3$, $Rh(C_5H_7O_2)(CO)_2$, $Rh(CO)[Ph_3P](C_5H_7O_2)$, $Rh(CO)_2(C_5H_7O_2)$, $(R^2{}_3P)_2Rh(CO)X$, $(R^2{}_3P)_3Rh(CO)H$, $Rh_2X_2Y_4$,

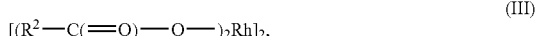

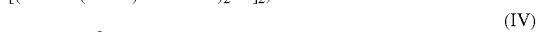

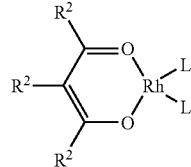

in which $R^2$ is identical or different and is a hydrogen atom or a monovalent, optionally substituted hydrocarbon radical having 1 to 24 carbon atoms, $R^3$ is identical or different and is hydrogen, —$OR^4$ or a monovalent, optionally substituted hydrocarbon radical having 1 to 24 carbon atoms, $R^4$ is identical or different and is a hydrogen atom or a monovalent optionally substituted hydrocarbon radical having 1 to 20 carbon atoms, X is identical or different and is halogen or hydrogen, L is identical or different and is CO, acetylacetonate, 0.5 cyclooctadiene, 0.5 norbornadiene or $P(R^3)_3$ and S is 2 or 3, where Y is ethyl, CO, $C_8H_{14}$ or 0.5 $C_8H_{12}$, R is identical or different and is an optionally substituted organic hydrocarbon radical free of aliphatic carbon-carbon multiple bonds and having up to 18 carbon atoms.

3. The composition of claim 1, wherein the iridium compound is selected from the group consisting of $Ir(OOCCH_3)_3$, $Ir(C_5H_7O_2)_3$, $[Ir(Z)(Ene)_2]_2$ and $[Ir(Z)(Diene)]_2$, in which Z is chlorine, bromine, iodine or alkoxy, Ene is olefin and Diene is cyclooctadiene.

4. The composition of claim 2, wherein the rhodium compound is selected from the group consisting of (acetylacetonato)carbonyl(triphenylphosphane)rhodium(I), (acetylacetonato)dicarbonylrhodium(I), carbonylchlorobis(triphenylphosphane)rhodium(I), (acetylacetonato)(1,5-cyclooctadiene)rhodium(I), rhodium(II) acetate dimer, rhodium (III) acetylacetonate and rhodium(II) octanoate dimer.

5. The flame-retardant composition of claim 2, which contains an organosilicon compound having basic nitrogen bonded via carbon to silicon.

6. The flame-retardant composition of claim 1, which contains at least one compound selected from the group consisting aluminum oxide; magnesium oxide; tin oxide; calcium oxide; barium oxide; cerium oxide; titanium oxide; zirconium oxide; zinc oxide; metal compounds of aluminum, magnesium, tin, calcium, barium, cerium, titanium, zirconium, and zinc which form oxides on heating; boric acid; and zinc borate.

7. The flame-retardant composition of claim 1, wherein platinum complexes having at least one unsaturated group are present.

8. The flame-retardant composition of claim 1, wherein the platinum-vinylsiloxane complex is the platinum-1,3-divinyl-1,1,3,3-tetramethyl-disiloxane complex.

9. A cable having at least one electrical conductor, wherein the conductor is insulated by a composition of claim 1.

10. A cable having at least two electrical conductors, the conductors insulated by a composition of claim 1.

11. A profile, which contains a composition of claim 1.

* * * * *